(12) United States Patent
Matsumoto et al.

(10) Patent No.: US 7,918,562 B2
(45) Date of Patent: Apr. 5, 2011

(54) PROJECTION OPTICAL SYSTEM HAVING A CURVED MIRROR

(75) Inventors: Shinya Matsumoto, Hirakata (JP); Ryuhei Amano, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 531 days.

(21) Appl. No.: 12/041,733

(22) Filed: Mar. 4, 2008

(65) Prior Publication Data

US 2008/0218644 A1      Sep. 11, 2008

(30) Foreign Application Priority Data

Mar. 7, 2007     (JP) .................... 2007-056965

(51) Int. Cl.
| | |
|---|---|
| G03B 21/00 | (2006.01) |
| G03B 21/26 | (2006.01) |
| G03B 21/28 | (2006.01) |
| G02B 27/14 | (2006.01) |
| G02B 5/10 | (2006.01) |
| G02F 1/00 | (2006.01) |
| G02F 1/1335 | (2006.01) |

(52) U.S. Cl. ............... 353/31; 353/98; 353/37; 353/33; 353/81; 359/631; 359/863; 348/751; 348/790; 349/5; 349/8

(58) Field of Classification Search .................... 353/31, 353/98, 77, 37, 33, 81; 359/460, 631, 863; 348/751, 790; 349/5, 8
See application file for complete search history.

(56) References Cited

U.S. PATENT DOCUMENTS

| | | | | |
|---|---|---|---|---|
| 7,048,388 | B2 * | 5/2006 | Takaura et al. | 353/99 |
| 7,066,610 | B2 * | 6/2006 | Yamada et al. | 353/119 |
| 7,714,945 | B2 * | 5/2010 | Tan et al. | 349/8 |
| 2007/0139623 | A1 * | 6/2007 | Hisada et al. | 353/78 |
| 2007/0253076 | A1 * | 11/2007 | Takaura et al. | 359/780 |

FOREIGN PATENT DOCUMENTS

| | | |
|---|---|---|
| JP | 2000-284228 A1 | 10/2000 |
| JP | 2004-258620 A1 | 9/2004 |

* cited by examiner

*Primary Examiner* — Georgia Y Epps
*Assistant Examiner* — Magda Cruz
(74) *Attorney, Agent, or Firm* — Marvin A. Motsenbocker; Mots Law, PLLC

(57) ABSTRACT

A projection display device comprises: a light source; liquid crystal panels disposed corresponding to R light, G light and B light; a light guiding optical system for guiding R light, G light and B light among light from the light source to respective corresponding liquid crystal panels; a dichroic prism for synthesizing the R light, G light and B light modulated by the liquid crystal panels; a projection optical system having a curved mirror for enlarging and projecting the light synthesized by the dichroic prism; and a bending mirror. A placement plane for optical members is orthogonal to a projection plane (screen surface), and shorter sides of optical members forming the liquid crystal panels and the light guiding optical system are placed on the placement plane.

4 Claims, 14 Drawing Sheets

FRONT VIEW
CUTOUT REGION
LENS

SIDE VIEW
CUTTING OFF
CUTTING OFF

TOP VIEW
CUTTING OFF
CUTTING OFF

CUTOUT LENS
16
9

CEILING MOUNT TYPE

DESK MOUNT TYPE

DESK MOUNT TYPE

CEILING MOUNT TYPE

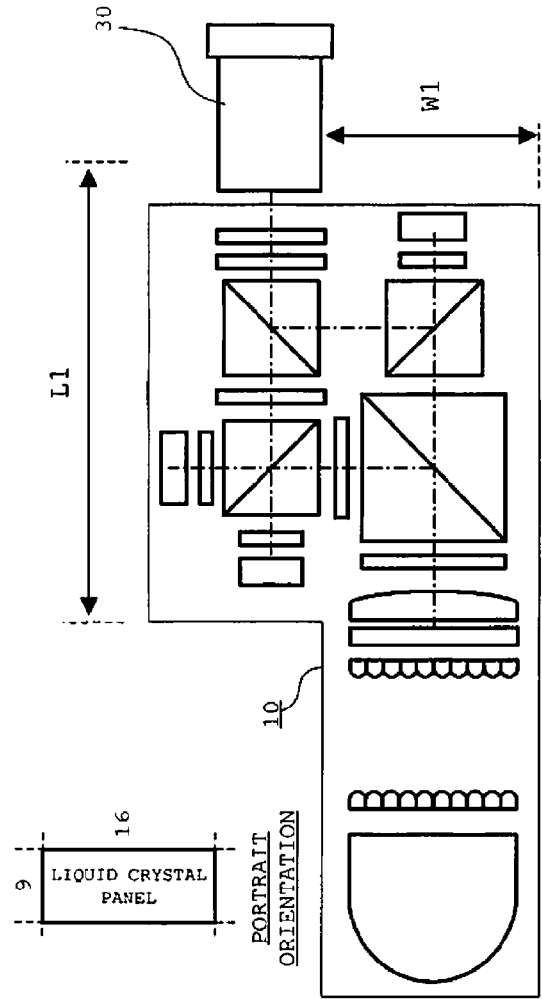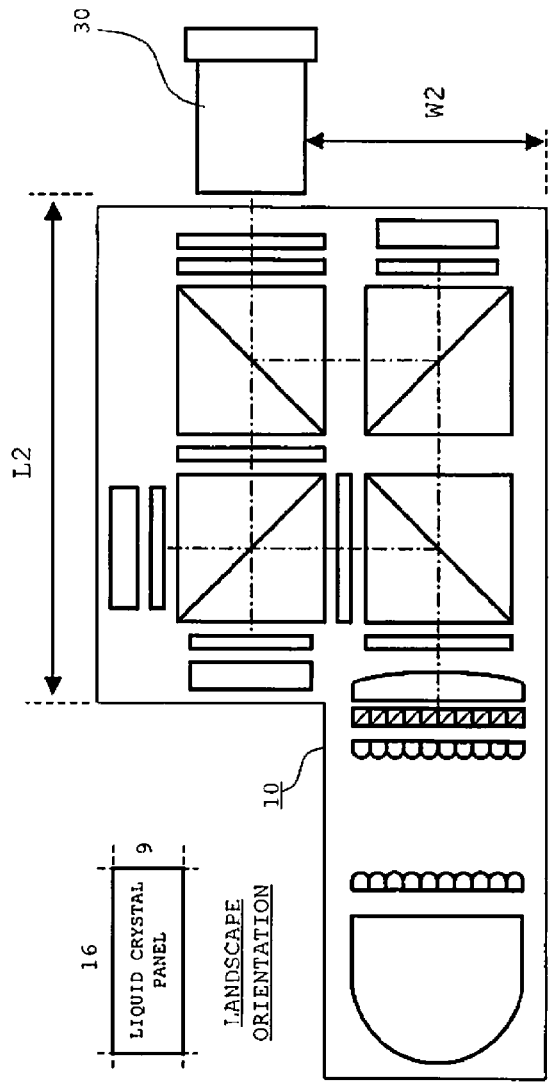
FIG. 13A
FIG. 13B

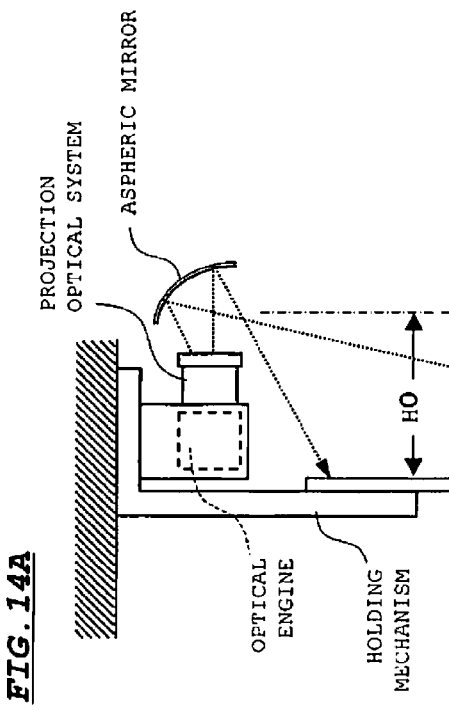
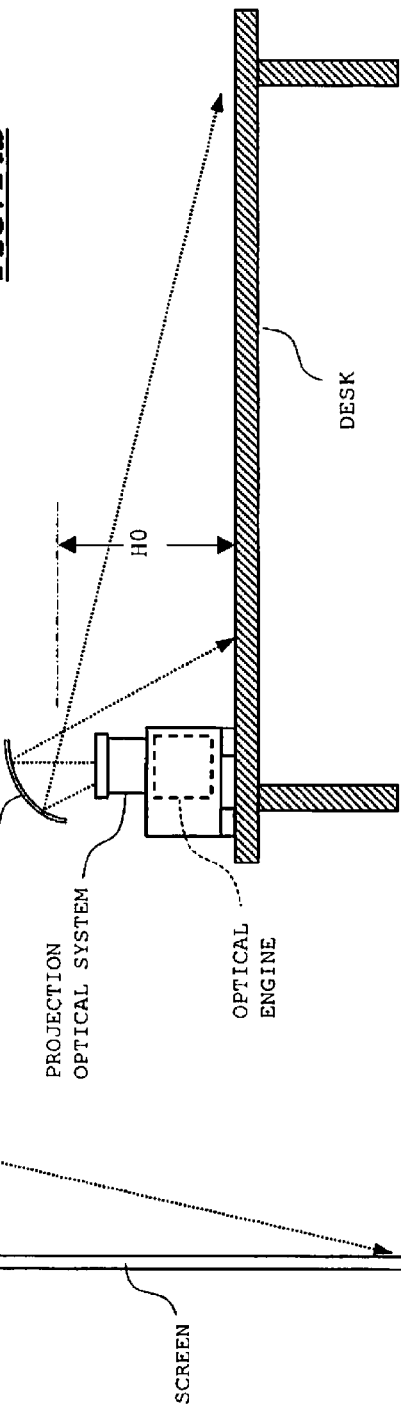
FIG. 14A
CEILING MOUNT TYPE
FIG. 14B
DESK MOUNT TYPE

PROJECTION OPTICAL SYSTEM HAVING A CURVED MIRROR

This application claims priority under 35 U.S.C. Section 119 of Japanese Patent Application No. 2007-056965 filed Mar. 7, 2007, entitled "PROJECTION DISPLAY DEVICE".

BACKGROUND OF THE INVENTION

1. Field of the Invention

The present invention relates to a projection display device for projecting an image on an imager onto a projection plane, and more particularly, is suitable for use in a projection display device for enlarging and projecting projection light from an oblique direction.

2. Description of the Related Art

A conventional projection display device (hereinafter referred to as "projector") is configured to project projection light from an optical engine onto a screen through a projection lens. Meanwhile, there has been proposed a method of reflecting light from a projection lens by an aspherical mirror to increase a spread angle of the projection light. According to this method, projection light is projected onto a screen surface from an oblique direction as shown in FIG. 14, thereby reducing space required for travel of the projection light.

In a projector of this kind, as a throw distance (H0) shown in FIGS. 14A and 14B becomes smaller, space required for travel of projection light is reduced. This decreases a possibility that the projection light is blocked by an obstacle or the like.

When a person makes a presentation with reference to an image projected onto a screen in a usage pattern shown in FIG. 14A, for example, the smaller the throw distance (H0) is, the more the possibility for the projection light to be blocked is decreased, and the less a projection image is prone to be darkened by shadow. Therefore, the presenter can smoothly make a presentation at a position closer to the screen. Similarly in a usage pattern shown in FIG. 14B, as the throw distance (H0) is smaller, there is a more lowered possibility that the projection light is blocked by person(s) around a desk or object(s) on the desk. This provides a user with higher operability and value in use.

As foregoing, decreasing the distance (H0) from a projection plane (screen surface) to a projection light emitting position improves the ease-of-use of a projection display device.

SUMMARY OF THE INVENTION

A projection display device in a main aspect of the present invention comprises: a light source; imagers individually disposed in correspondence to light in wavelength bands to be modulated; a light guiding optical system for guiding light in the respective wavelength bands among light from the light source to the respective corresponding imagers; a light synthesis element for synthesizing the light in the respective wavelength bands modulated by the imagers; and a projection optical system having a curved mirror for enlarging and projecting the light synthesized by the light synthesis element. A placement plane for optical members forming the imagers and the light guiding optical system is approximately orthogonal to the projection plane, and these optical members are placed on the placement plane such that shorter sides of the optical members forming the imagers and the light guiding optical system are in contact with the placement plane.

According to a configuration in this aspect, shorter sides of the optical members forming the imagers and the light guiding optical system are in contact with the placement plane, which can decrease a distance (throw distance: H0) from the projection plane to the projection light emitting position, as compared to a case where longer sides of these members are in contact with the placement plane.

This point will be more understood by description of a preferred embodiment with reference to FIG. 4 below.

BRIEF DESCRIPTION OF THE DRAWINGS

The foregoing and other objectives and novel features of the present invention will be more fully understood by reading description of a preferred embodiment in combination with the attached drawings as follows:

FIGS. 13A and 13B show dimensions of the optical engine with the members including the liquid crystal panel placed in portrait orientation and dimensions of the optical engine with the members including the liquid crystal panel placed in landscape orientation, respectively; and FIG. 14 is a view showing an configuration example for wider angle with an aspherical mirror.

The drawings are merely intended for illustration and do not set any limits on the scope of the present invention.

DESCRIPTION OF PREFERRED EMBODIMENT

Figure 1:
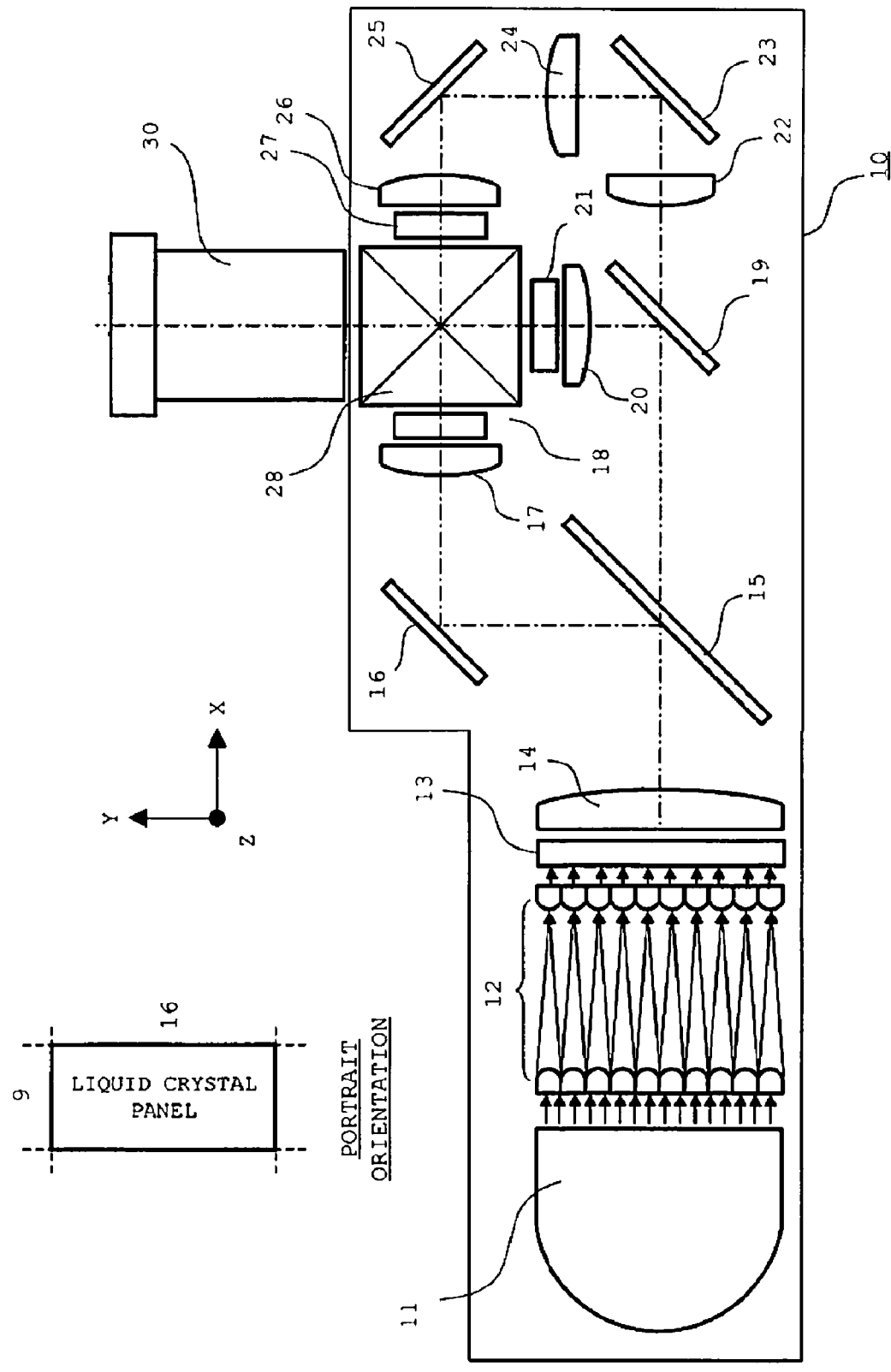
FIG. 1 is a plane view showing an optical system in a projector in an embodiment of the present invention.
Figure 2A:
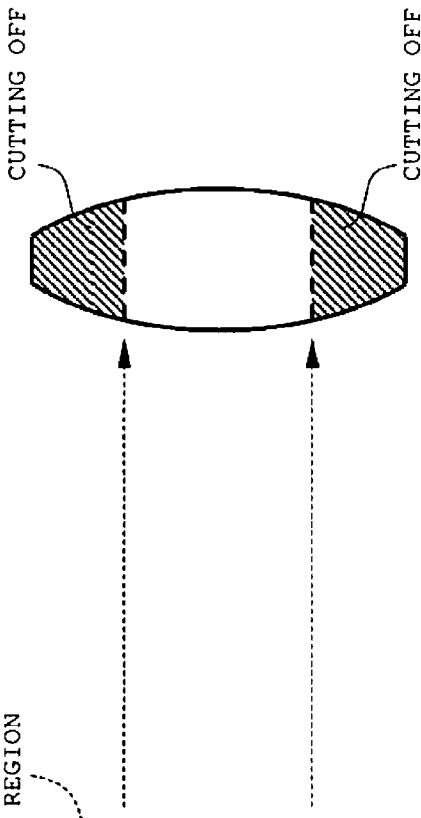
FIG. 2 is a view exemplifying a shape of a lens in the embodiment of the present invention.
Figure 2B:
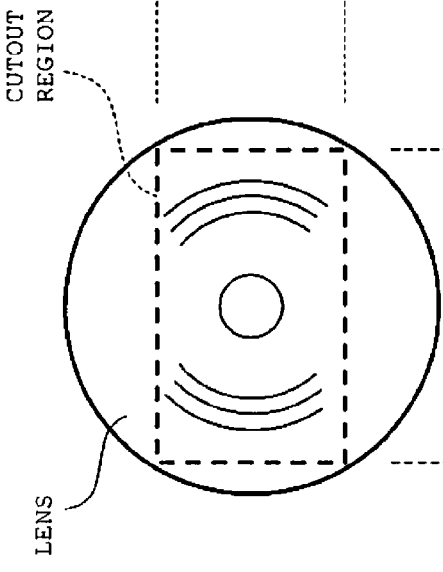
Figure 2C:
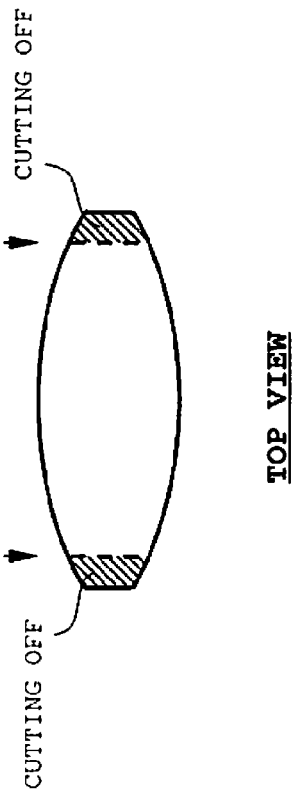
Figure 2D:
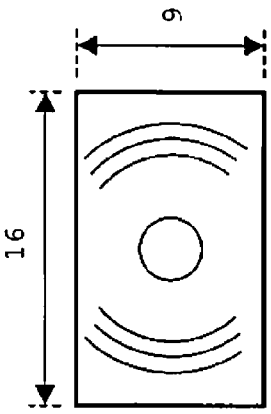

Below, preferred embodiment of the present invention will be described with reference to the drawings. FIG. 1 shows an optical system in a projector in an embodiment.

In FIG. 1, a reference numeral 10 denotes an optical engine, and a reference numeral 30 denotes a projection lens. The optical engine 10 comprises an optical system covering from a light source 11 to a dichroic prism 28, and also comprises a suction fan (not shown) for cooling the light source 11.

The light source 11 comprises a lamp and a reflector, and emits approximately parallel light to a fry-eye integrator 12. The fry-eye integrator 12 comprises first and second integrators having fry eye-like lens groups, and gives a lens function to incident light from the light source 11 such that the incident light quantity is uniformly distributed to liquid crystal panels 18, 21 and 27. More specifically, the light transmitting through the respective lens in the lens groups arranged in the shape of a fry eye enters the liquid crystal panels 18, 21 and 27 with a spread of an aspect ratio of these liquid crystal panels (16:9 in this embodiment), respectively.

A PBS (polarized beam splitter) array 13 has a plurality of PBSs and ½ wavelength plates arranged like an array, and aligns a polarization direction of incident light from the fry-eye integrator 12. A condenser lens 14 converges the incident light from the PBS array 13.

A dichroic mirror 15 reflects only light in a red wavelength band (hereinafter referred to as "R light"), among the incident light from the condenser lens 14, and lets light in a blue wavelength band (hereinafter referred to as "B light") and light in a green wavelength band (hereinafter referred to as "G light") transmit through, for example. A mirror 16 reflects the R light reflected by the dichroic mirror 15 such that the R light enters the condenser lens 17.

The condenser lens 17 give a lens function to the R light such that the R light as parallel light enters the liquid crystal panel 18. The liquid crystal panel 18 is driven in response to a video signal for red color, and modulates the R light in response to a driven state of the liquid crystal panel 18. The R light transmitting through the condenser lens 17 enters the liquid crystal panel 18 via an incoming-side polarizer (not shown).

A dichroic mirror 19 reflects only the G light of the B light and the G light transmitting through the dichroic mirror 15, for example. A condenser lens 20 gives a lens function to the G light such that the G light as parallel light enters the liquid crystal panel 18. The liquid crystal panel 21 is driven in response to a video signal for green color, and modulates the G light in response to a driven state of the liquid crystal panel 21. The G light transmitting through the condenser lens 20 enters the liquid crystal panel 21 via an incoming-side polarizer (not shown).

Relay lenses 22 and 24 give a lens function on the B light such that an incident state of the B light to the liquid crystal panel 27 becomes equal to incident states of the R light and G light to the liquid crystal panels 17 and 20. Mirrors 23 and 25 change a light path of the B light to guide the B light transmitting through the dichroic mirror 19 to the liquid crystal panel 27.

A condenser lens 26 gives a lens function to the B light such that the B light as parallel light enters the liquid crystal panel 27. The liquid crystal panel 27 is driven in response to a video signal for blue color, and modulates the B light in response to a driven state of the liquid crystal panel 27. The B light transmitting through the condenser lens 26 enters the liquid crystal panel 27 via an incoming-side polarizer (not shown).

A dichroic prism 28 synthesizes the R, G and B light modulated by the liquid crystal panels 18, 21 and 27 and transmitting through an outgoing-side polarizer (not shown), and lets the synthesized light enter the projection lens 30.

The projection lens 30 comprises a lens group for image formation of the projection light onto the projection plane, and an actuator for displacing part of the lens group in the direction of the optical axis and adjusting zoom and focus states of a projection image.

Among the members comprising the optical engine 10, the liquid crystal panels 18, 21 and 27, the condenser lenses 17, 20 and 26, and the relay lenses 22 and 24 are placed on a placement plane (a plane parallel to an X-Y plane in FIG. 1) of the optical unit 10 such that shorter sides of these members are in contact with the placement plane. As shown on the upper left side of FIG. 1, the liquid crystal panels 18, 21 and 27 are placed on the placement plane in portrait orientation such that shorter sides of the liquid crystal panels 18, 21 and 27 are in contact with the placement plane.

The condenser lenses 17, 20 and 26 and the relay lenses 22 and 24 are respectively formed by cutting out a central part from a circular lens corresponding to an aspect ratio of the liquid crystal panels 18, 21 and 27, as shown in FIGS. 2A, 2B, 2C and 2D. These lenses are placed in portrait orientation on the placement plane such that shorter sides of the lenses are in contact with the placement plane.

Figure 3:
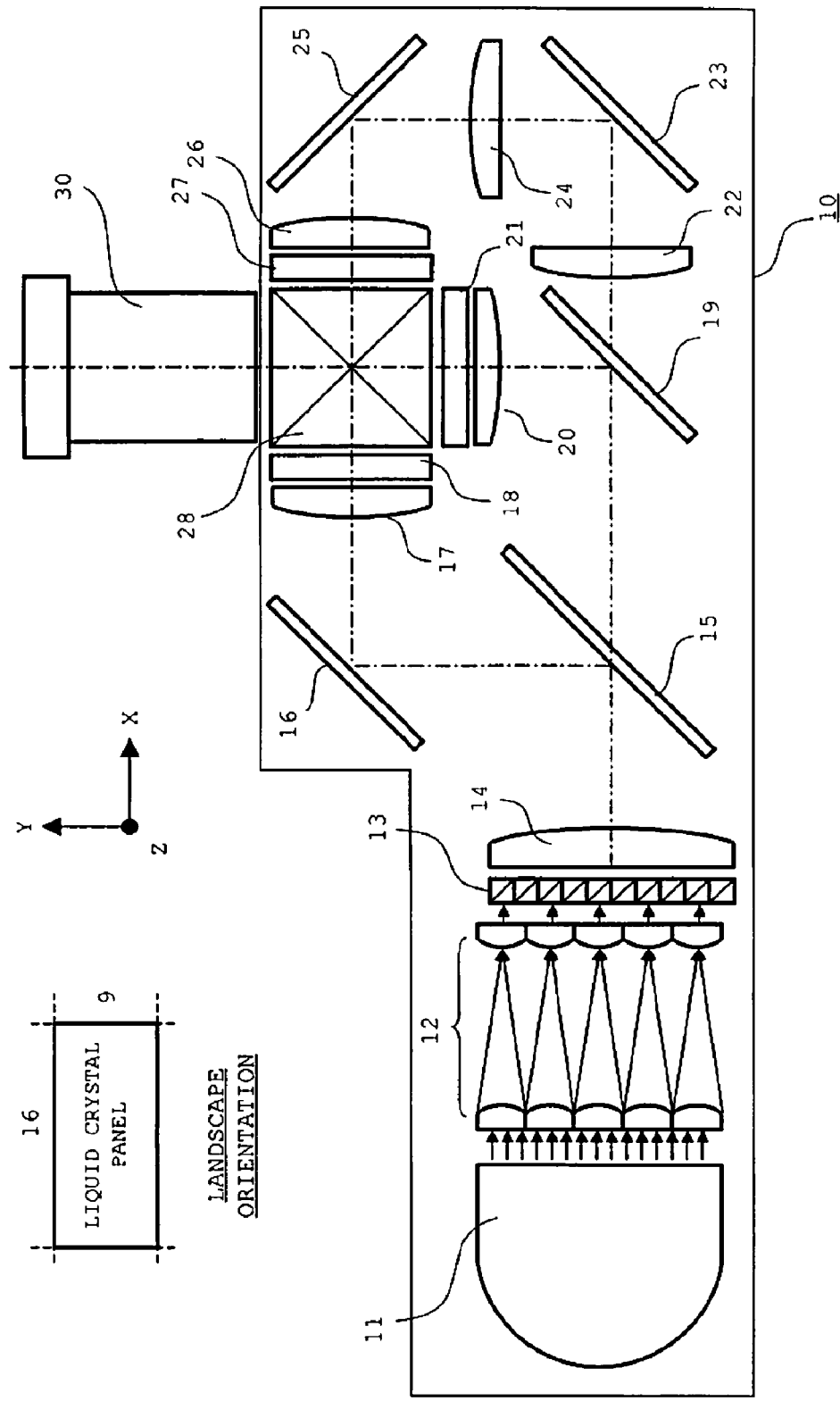
FIG. 3 is a plane view showing members including a liquid crystal panel placed in landscape orientation (a comparative example)

FIG. 3 illustrates the liquid crystal panels 18, 21 and 27, the condenser lenses 17, 20 and 26, and the relay lenses 22 and 24 which are placed in landscape orientation on the placement plane such that longer sides of the panels and lenses are in contact with the placement plane (a comparative example).

As understood from a comparison between FIG. 1 and FIG. 3, when the liquid crystal panels 18, 21 and 27, the condenser lenses 17, 20 and 26, and the relay lenses 22 and 24 are placed in portrait orientation, these members are reduced in a dimension in a direction of an X-Y plane as compared to the case in landscape orientation, and also the dichroic mirror 19 and the mirrors 16, 23 and 25 for guiding light to the foregoing members are reduced in a dimension in the direction of the X-Y plane. The reductions of the dimension make the optical engine 10 smaller in a dimension in the direction of the X-Y plane.

When these members are placed in portrait orientation, the dichroic prism 28 can also be reduced in dimension in the direction of the X-Y plane accordingly. By reducing the dimension of the dichroic prism 28, the optical engine 10 can be further decreased in dimension in the direction of the X-Y plane.

Figures 4A, 4B:
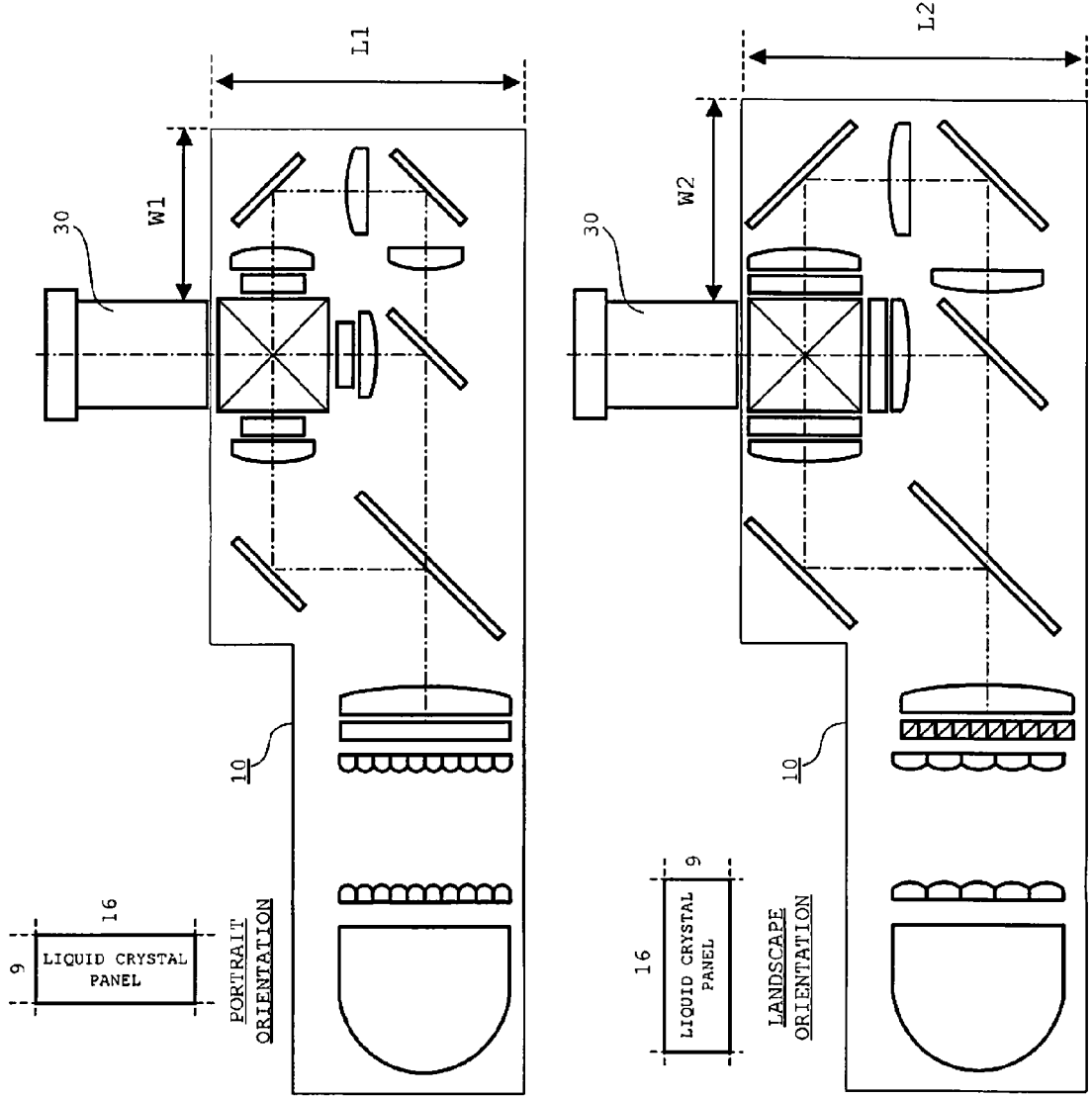
FIGS. 4A and 4B show dimensions of an optical engine with the members including a liquid crystal panel placed in portrait orientation and dimensions of the optical engine with the members including the liquid crystal panel placed in landscape orientation, respectively.

FIGS. 4A and 4B illustrate the dimensions of the optical lens 10 in the direction of the X-Y plane in which the liquid crystal panels 18, 21 and 27, the condenser lenses 17, 20 and 26, and the relay lenses 22 and 24 are placed in portrait orientation (see FIG. 4A) and in landscape orientation (see FIG. 4B), respectively. As understood from FIGS. 4A and 4B, distances W1 and W2 have a relationship of W1<W2, and distances L1 and L2 have a relationship of L1<L2.

According to the embodiment, by placing the liquid crystal panels 18, 21 and 27, the condenser lenses 17, 20 and 26, and the relay lenses 22 and 24 in portrait orientation, the optical engine 10 can be reduced in the dimension in the direction of the X-Y plane and hence can be miniaturized.

Figure 5:
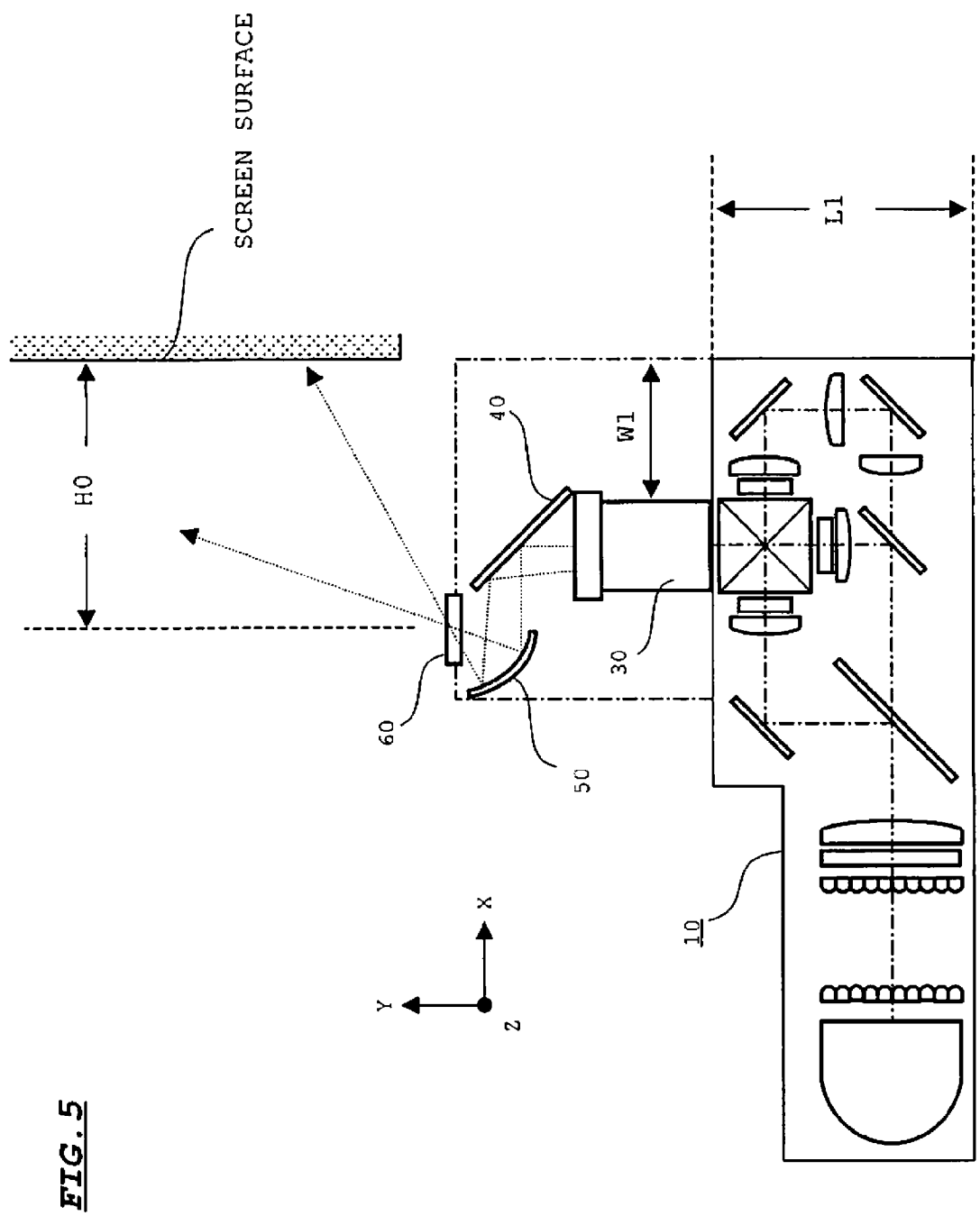
FIG. 5 is a plane view showing a configuration of the projector in the embodiment of the present invention.

FIG. 5 illustrates a configuration in which a bending mirror 40 and an aspherical mirror 50 are added to the configuration in FIG. 1. The bending mirror 40 reflects light emitted from the projection lens 30 to the aspherical mirror 50. The aspherical mirror 50 widens an angle of the projection light entered from the bending mirror 40, and projects the light onto the projection plane (screen surface). A projection window 60 is formed from a plate-like body having translucency, and is disposed at a projection light transmitting position in a housing for storing the projection lens 30, the bending mirror 40 and the aspherical mirror 50.

The projection light emitted from the projection lens 30 (the light synthesized from the modulated R, G and B light), after a light path thereof is bent by the bending mirror 40, is enlarged and projected by the aspherical mirror 50 onto the projection plane (screen surface). In the embodiment, since the liquid crystal panels 18, 21 and 27 are placed in portrait orientation, an image projected onto the projection plane (screen surface) is longer in a direction of a Z axis.

In the configuration example of FIG. 5, since the distance W1 is made shorter as mentioned above, the distance (H0) from the projection light emitting position to the projection plane (screen surface) is shortened. Accordingly, there is a lowered possibility that the projection light is blocked by an obstacle or the like, which provides a user with higher operability and value in use.

In the configuration example of FIG. 5, the light from the light source 11 enters the dichroic mirror 15 from a direction of an X axis. Alternatively, the light from the light source 11 may enter the dichroic mirror 15 from a direction of a Y axis, as shown in FIG. 6, for example.

Figure 6:
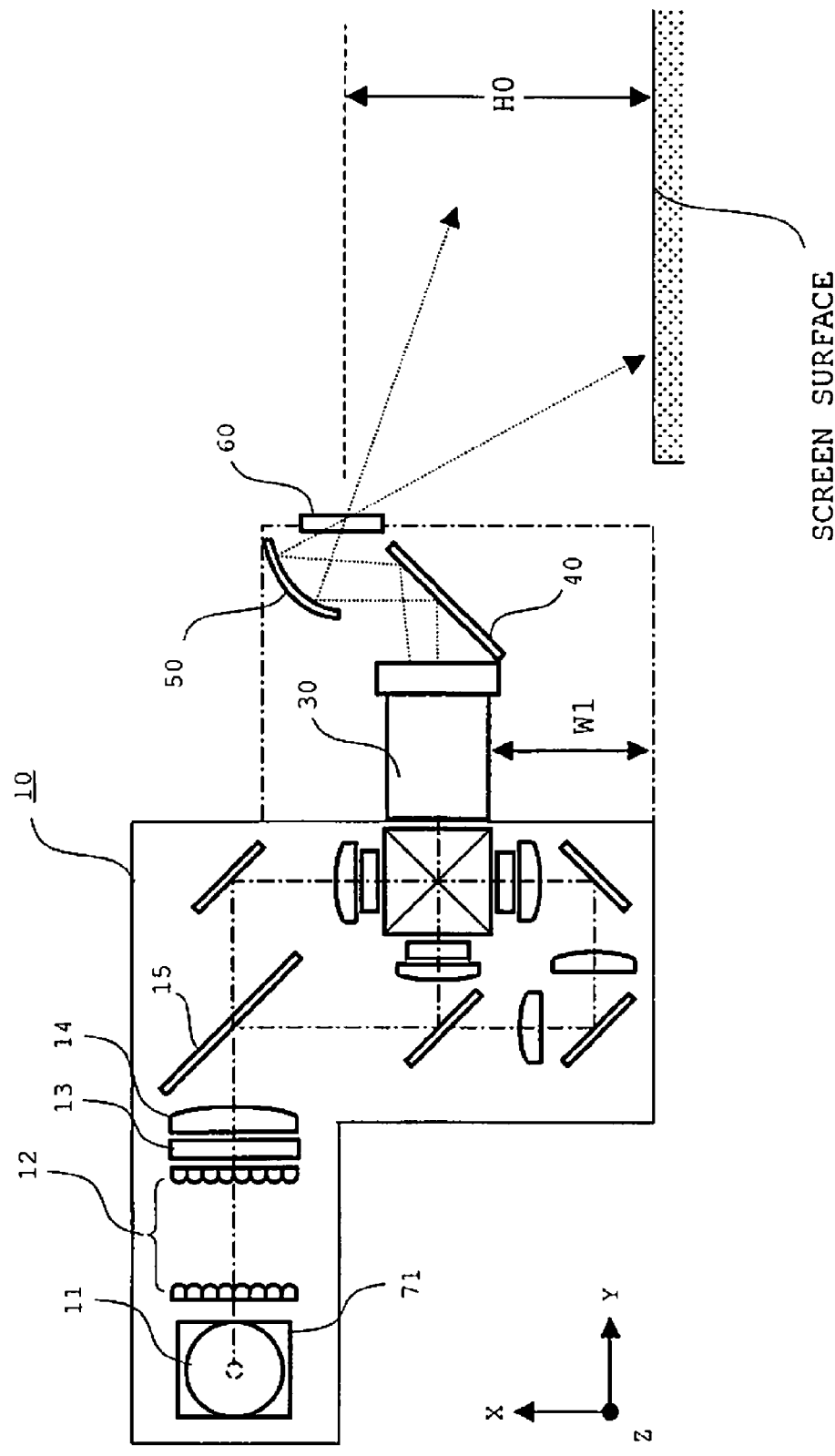
FIG. 6 is a plane view showing an exemplary modification of the projector in the embodiment of the present invention.

In a configuration example of FIG. 6, the light source 11 is disposed to emit light in the direction of the Z axis. The light from the light source 11 is reflected by the mirror 71 in the direction of the Y axis. Then, the light enters the fry-eye integrator 12, the PBS array 13, the condenser lens 14, and then the dichroic mirror 15. In this embodiment, the dichroic mirror 15 is configured to let the R light transmit through and reflect the B and G light. The subsequent light path is the same as the case with FIG. 1.

Figure 7:
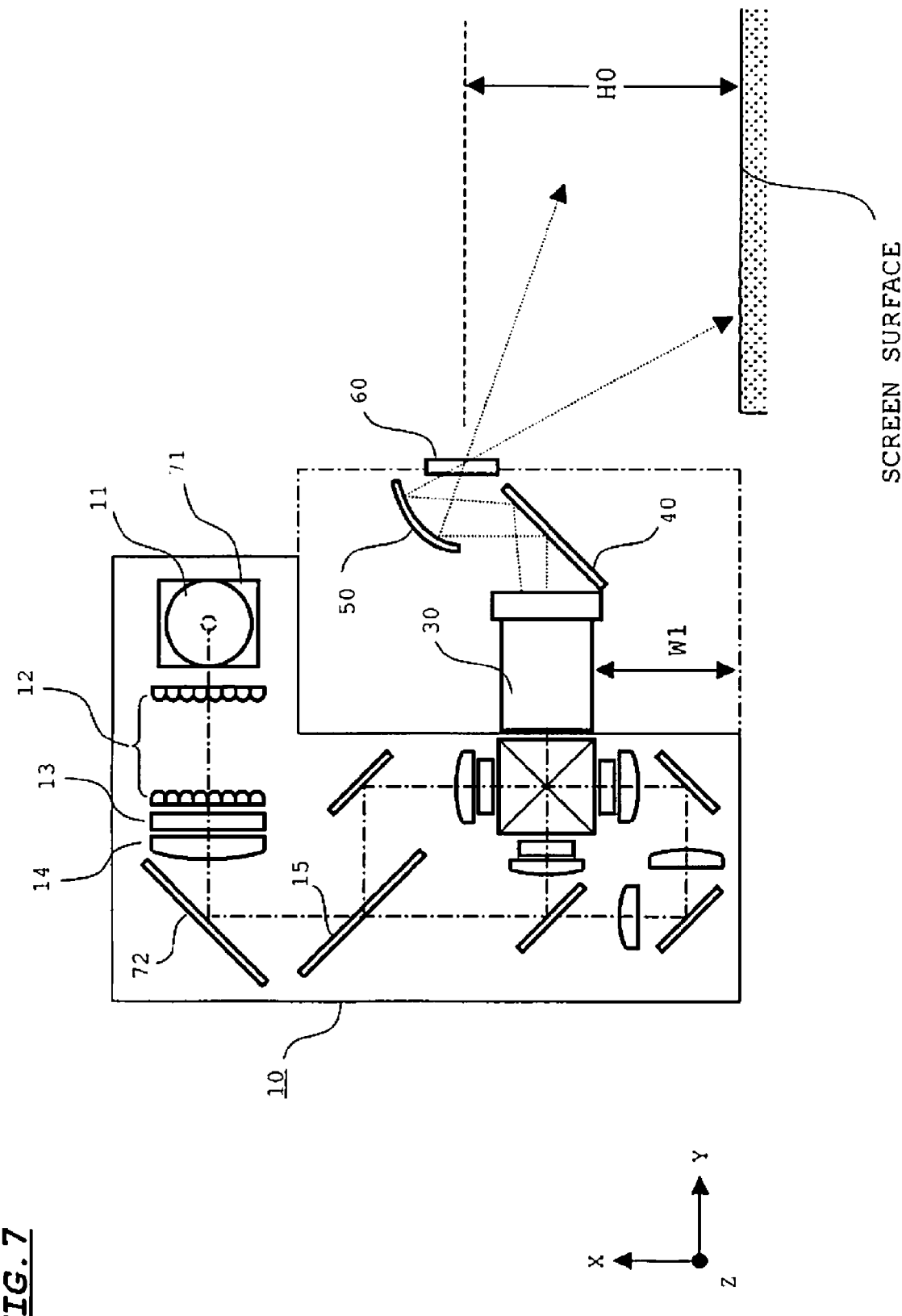
FIG. 7 is a plane view showing another exemplary modification of the projector in the embodiment of the present invention.

Alternatively, as shown in FIG. 7, the optical system may be configured such that an area from the light source 11 to the condenser lens 14 in the configuration example of FIG. 5 is bent in the direction of the Y axis toward the projection lens 30. The light source 11 here is disposed to emit light in the direction of the Z axis. Light from the light source 11 is reflected by the mirror 71 in the direction of the Y axis. After that, the light transmits through the fry-eye integrator 12, the PBS array 13, and the condenser lens 14, and then is reflected by the mirror 72 and enters the dichroic mirror 15. The subsequent light path is the same as the case with FIG. 1.

In the configuration example of FIG. 7, the area from the light source 11 to the condenser lens 14 is bent in the direction of the Y axis, which makes the light source 11 approximately horizontal in use as compared to the configuration example of FIG. 5. The configuration example of FIG. 7 also makes the projector more stable (cubical) as compared to the configuration example of FIG. 6, because a projected area from the light source 11 to the condenser lens 14 is shifted to above the projection lens 30.

Figure 8A:
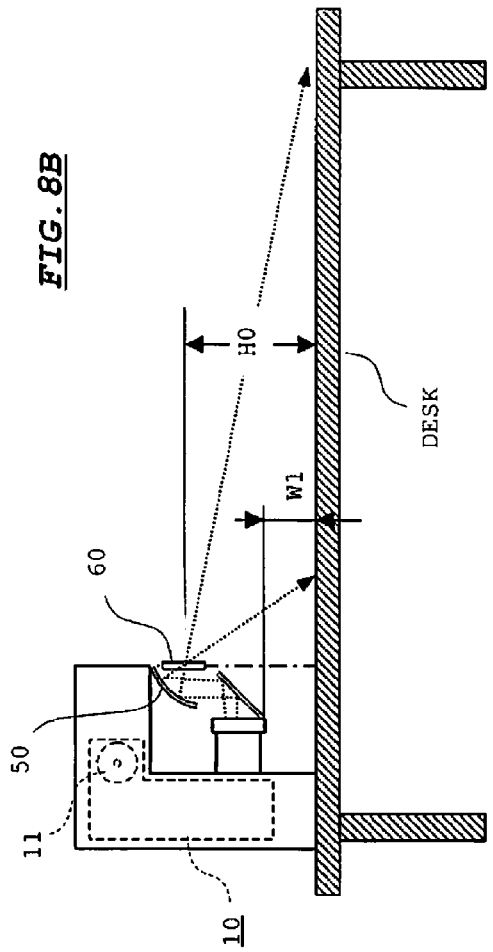
FIGS. 8A and 8B show usage patterns of the projector in the embodiment of the present invention, respectively.
Figure 8B:
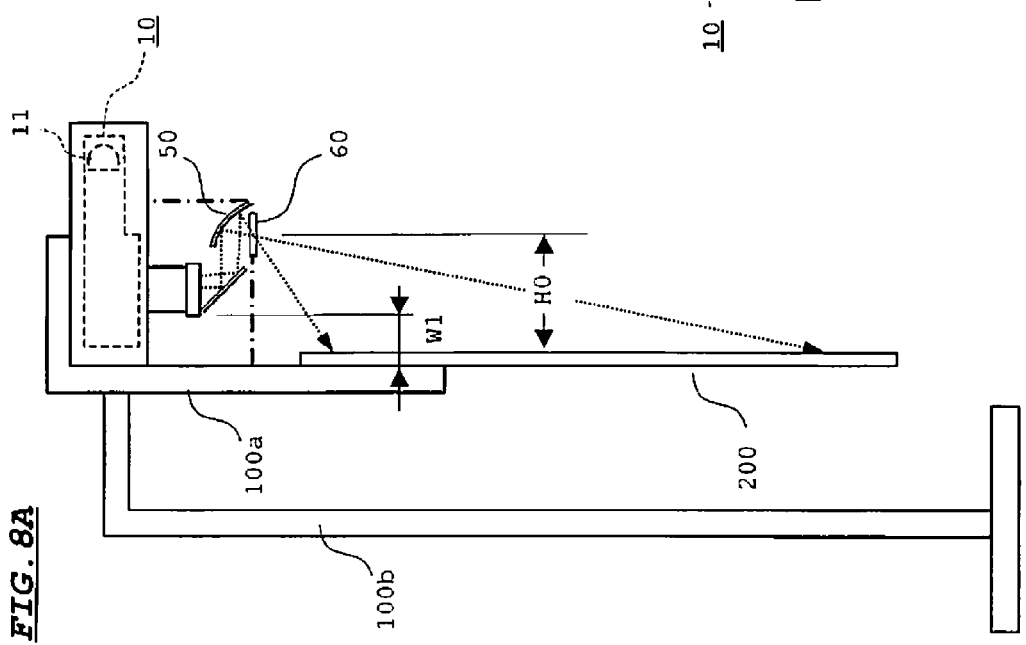

FIGS. 8A and 8B show usage patterns of the projector in the embodiment, respectively. FIG. 8A illustrates a usage pattern in which the projector in the configuration example of FIG. 5 is suspended from a ceiling, and FIG. 8B illustrates a usage pattern in which the projector in the configuration example of FIG. 7 is mounted on a desktop. In the usage pattern of FIG. 8A, a screen 200 is integrated with the projector via a holding mechanism 100a, and the holding mechanism 100a is attached to a stand 100b set up on a floor.

In each of the usage patterns, since the distance W1 is made shorter as stated above, the distance (H0) from the projection light emitting position to the projection plane (screen surface) is shortened.

In this embodiment, since the light source 11 is disposed distant from the projection plane (screen surface), a means for cooling the light source 11 may be separated from the projection plane (screen surface). Therefore there is no need to provide space for placing a cooling unit (suction fan or the like) and leave a clearance for air suction and exhaust at a position facing the projection plane (screen surface). Accordingly, a side of the projector body facing the projection plane (screen surface) comes into contact with the holding mechanism 100a or a desktop, as shown in the usage patterns of FIGS. 8A and 8B, for example. As a result, the distance (throw distance: H0) from the projection plane (screen surface) to the projection light emitting position can be shortened.

As foregoing, according to this embodiment, the distance (H0) from the projection light emitting position to the projection plane (screen surface) can be shortened. Therefore there is a lowered possibility that the projection light is blocked by an obstacle or the like, resulting in higher operability and use value of the projector.

In the foregoing embodiment, the projection light emitted from the projection lens 30 is bent by the bending mirror 40 and then enters the aspherical mirror 50. Alternatively, the projection light emitted from the projection lens 30 may be directly entered into the aspherical mirror 50.

Figure 9:
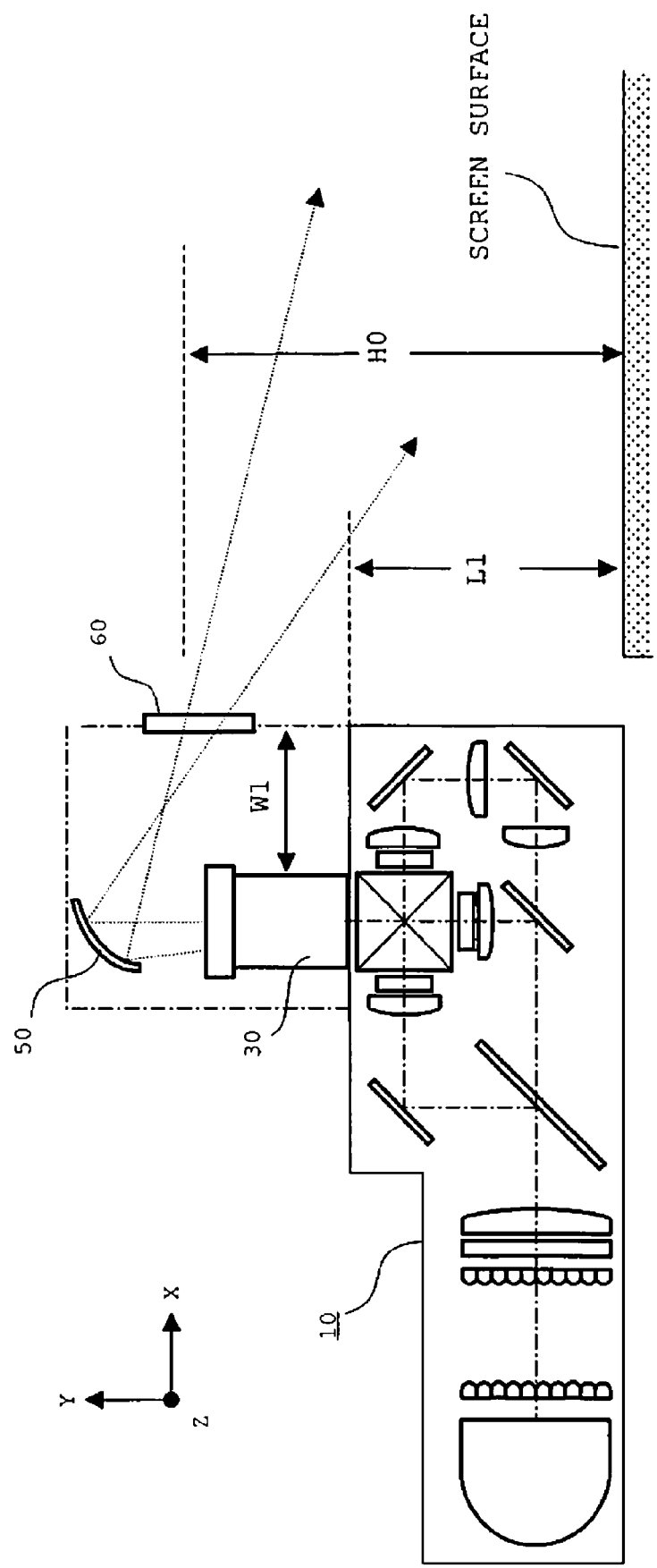
FIG. 9 is a plane view showing still another exemplary modification of the projector in the embodiment of the present invention.

FIG. 9 illustrates a configuration example in which the projection light from the projection lens 30 enters directly the aspherical mirror 50. In this configuration example, since the liquid crystal panels 18, 21 and 27 are also placed in portrait orientation, an image projected onto the projection plane (screen surface) is longer in the direction of the Z axis, same as the foregoing embodiment.

Additionally, in this configuration example, as mentioned above, the distance L1 is shorter as compared to the case where the liquid crystal panels 18, 21 and 27, the condenser lenses 17, 20 and 26, and the relay lenses 22 and 24 are placed in landscape orientation, the distance (H0) from the projection light emitting position to the projection plane (screen surface) is shortened. Accordingly, there is a lowered possibility that the projection light is blocked by an obstacle or the like, as compared to the case where these members are placed in portrait orientation, which provides a user with higher operability and value in use.

In this configuration example, the bending mirror 40 may be omitted, thereby achieving reduction in parts count and costs as compared to the configuration example of FIG. 5. On the other hand, as understood from a comparison between FIG. 5 and FIG. 9, the distance (H0) from the projection light emitting position to the projection plane (screen surface) can be more shortened by letting the projection light from the projection lens 30 enter the aspherical mirror 50 via the bending mirror 40, than by letting the projection light enter directly the aspherical mirror 50. Therefore, from the viewpoint of lowering a possibility that the projection light is blocked by an obstacle or the like, it can be said that the configuration example of FIG. 5 is more preferred than that of FIG. 9.

Figure 10:
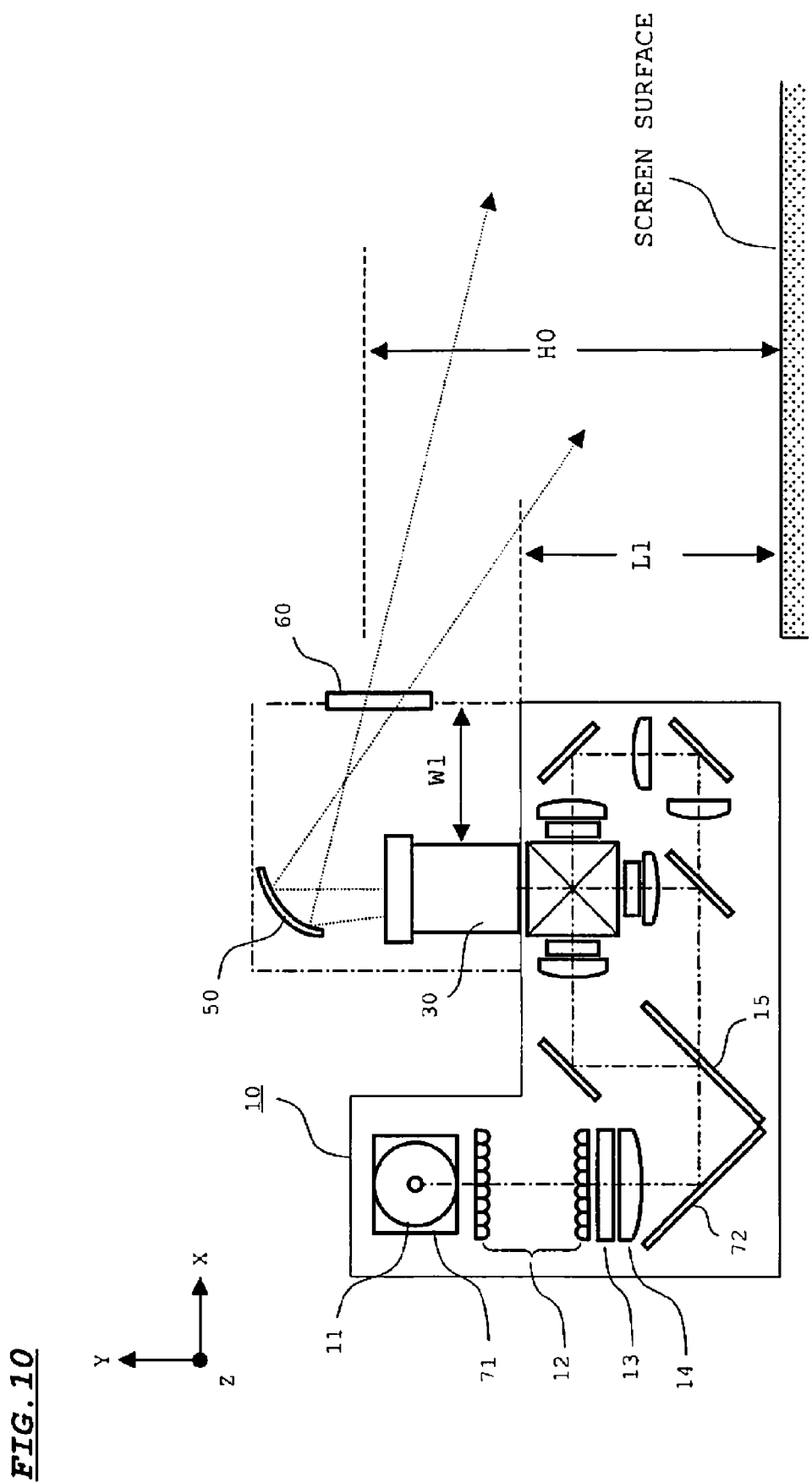
FIG. 10 is a plane view showing further another exemplary modification of the projector in the embodiment of the present invention.

In the configuration example of FIG. 9, the area from the light source 11 to the condenser lens 14 may also be bent in the direction of the Y axis as shown in FIGS. 6 and 7. FIG. 10 illustrates a configuration example in which the area from the light source 11 to the condenser lens 14 is bent in the direction of the Y axis in such a manner to become closer to the projection lens 30.

The light source 11 here is disposed so as to emit light in the direction of the Z axis. Light from the light source 11 is reflected by the mirror 71 in the direction of the Y axis. After that, the light transmits through the fry-eye integrator 12, the PBS array 13, and the condenser lens 14, and then is reflected by the mirror 72 and enters the dichroic mirror 15. The subsequent light path is the same as the case with FIG. 1.

In the configuration example of FIG. 10, the area from the light source 11 to the condenser lens 14 is bent in the direction of the Y axis in such a manner as to become closer to the projection lens 30, which allows the projector to be compact in size.

Figure 11B:
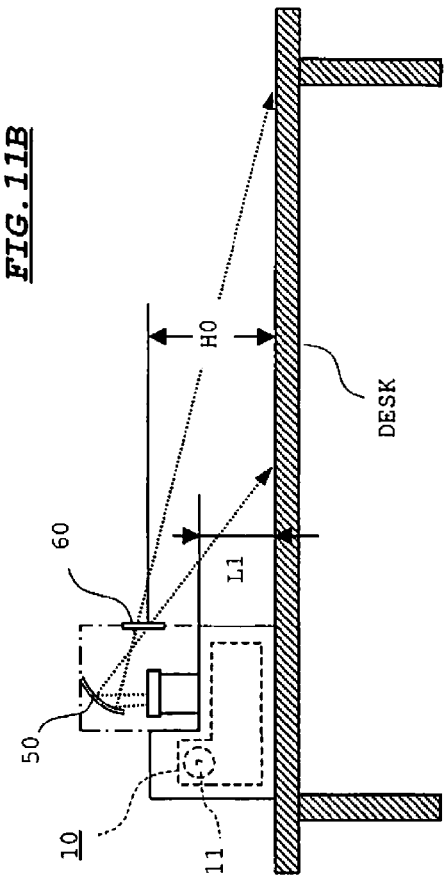
FIGS. 11A and 11B show usage patterns of the projector in the embodiment of the present invention, respectively.
Figure 11A:
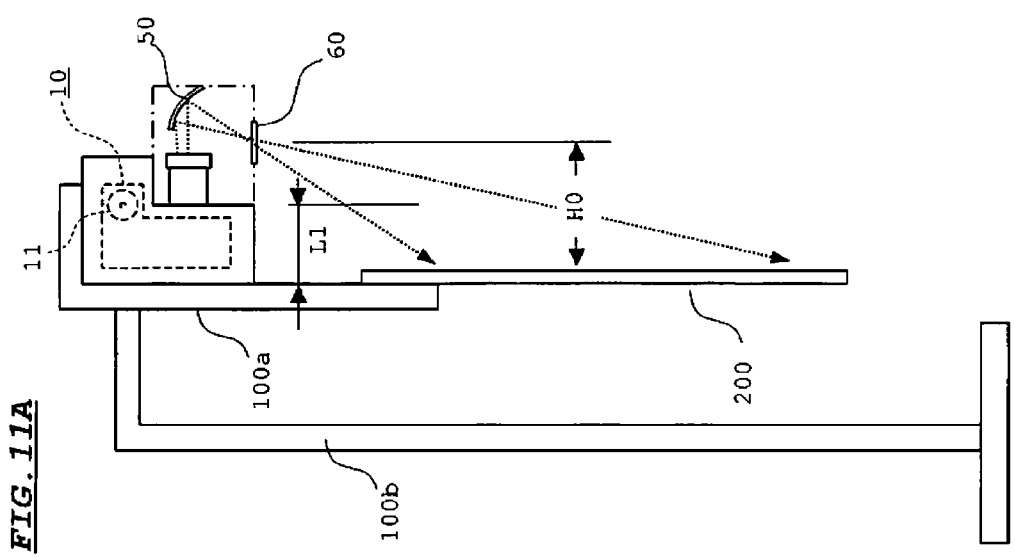

FIGS. 11A and 11B illustrate usage patterns in which the projector in the configuration example of FIG. 10 is suspended from a ceiling and mounted on a desktop, respectively. In the usage pattern of FIG. 11A, the screen 200 is integrated with the projector via the holding mechanism 100a, and the holding mechanism 100a is attached to the stand 100b set up on a floor.

In each of the usage patterns, since the distance L1 is made shorter as stated above, the distance (H0) from the projection light emitting position to the projection plane (screen surface) is shortened.

In the usage patterns of FIGS. 11A and 11B, same as the embodiment, since the light source 11 is disposed distant from the projection plane (screen surface), a means for cooling the light source 11 may be separated from the projection plane (screen surface). There is no need to provide space for placing a cooling unit (suction fan or the like) and leave a clearance for suction and exhaust at a position facing the projection plane (screen surface). Accordingly, a side of the projector body facing the projection plane (screen surface) comes into contact with the holding mechanism 100a or a desktop. As a result, the distance (throw distance: H0) from the projection plane (screen surface) to the projection light emitting position can be shortened.

According to the usage patterns of FIGS. 11A and 11B as described above, the distance (H0) from the projection light emitting position to the projection plane (screen surface) can be shortened. This decreases a possibility that the projection light is blocked by an obstacle or the like, resulting in higher operability and use value of the projector.

In using the projector in the configuration example of FIG. 9 in the usage patterns shown in FIGS. 11A and 11B, the light source 11 becomes closer to the projection plane (screen surface) Accordingly, it may be difficult to bring a side of the projector body facing the projection plane (screen surface) in contact with the holding mechanism 100a or the desktop for suction and exhaust with respect to the cooling unit. Therefore, for shortening the distance (H0) with the side in contact with the holding mechanism 100a or the desktop, it is preferred to bend the area from the light source 11 to the condenser lens 14 in the direction of the Y axis in such a manner to become closer to the projection lens 30, as shown in FIG. 10.

Although the transmissive liquid crystal panels are used as imagers in the foregoing embodiment, the present invention may be also applicable to a projector using reflective liquid crystal panels.

Figure 12:
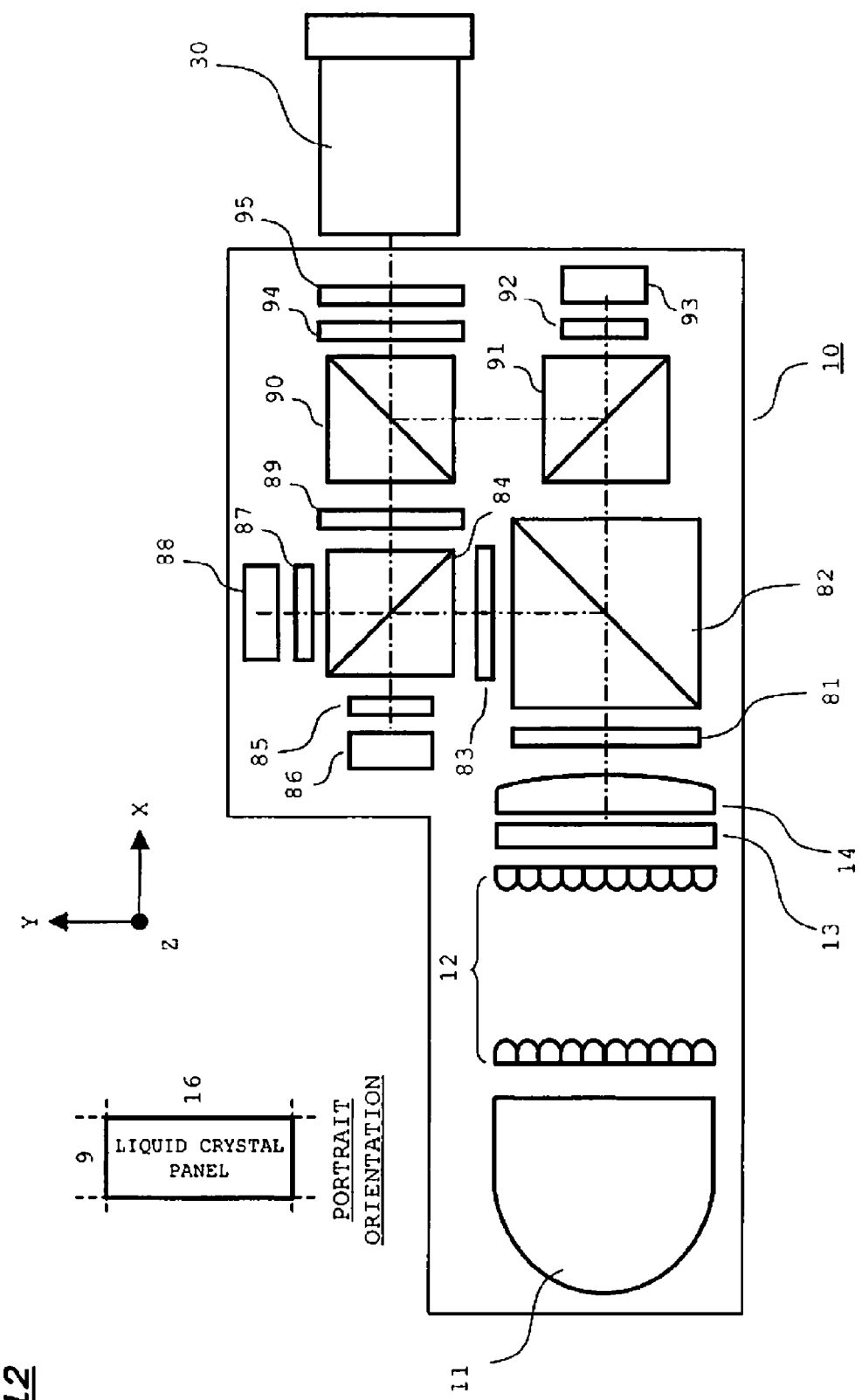
FIG. 12 is a plane view showing an exemplary modification of the optical system in the projector in the embodiment of the present invention.

FIG. 12 illustrates a configuration example using reflective liquid crystal panels. An area from the light source 11 to the condenser lens 14 is configured in the same manner as that in the foregoing embodiment.

Light transmitting through the condenser lens 14 is S polarized light with respect to a polarization plane of a polarization beam splitter (PBS) 82. Among the light, the G light is converted into P polarized light by a ½ wavelength plate 81 with wavelength selectivity. Therefore, the G light transmits through the PBS 82, and the B and R light are reflected by the PBS 82.

For the B and R light reflected by the PBS 82, the R light is converted into P polarized light by a ½ wavelength plate 83 with wavelength selectivity. Therefore, the B light is reflected by a PBS 84 and the R light transmits through the PBS.

The B light reflected by the PBS 84 is converted into circularly polarized light by a ¼ wavelength plate 85, and then enters a reflective liquid crystal panel 86. The B light here goes to and from the liquid crystal panel 86, therefore a circling direction of the circularly polarized light is reversed only at positions of pixels in the ON state, for example. Therefore, when transmitting through again the ¼ wavelength plate 85, the B light is turned into P polarized light at positions of pixels in the ON state and is turned into S polarized light at positions of pixels in the OFF state. Then, among the light, only the light of the P polarized light corresponding to the positions of the pixels in the ON state transmits through the PBS 84 and enters a PBS 90 via a ½ wavelength plate 89.

Similarly, after transmitting through the ½ wavelength plate 83 and then through the PBS 84, the R light goes back and forth between a ¼ wavelength plate 87 and a reflective liquid crystal panel 88. Accordingly, only the portions corresponding to the positions of pixels in the ON state are reflected by the PBS 84 and guided into the projection lens 30. The R light is converted into P polarized light by the ½ wavelength plate 89 with wavelength selectivity, and then enters the PBS 90.

As stated above, both the B and R light modulated by the liquid crystal panels 86 and 88 enter the PBS 90 and transmit through the PBS 90, as P polarized light.

After transmitting through the PBS 82, the G light transmits through a PBS 91, and then goes back and forth between the ¼ wavelength plate 92 and a reflective liquid crystal panel 93, therefore only the portions corresponding to the positions of pixels in the ON state are reflected by the PBS 91 and then enter the PBS 90. The G light as S polarized light enters the PBS 90, and is reflected by the PBS 90.

As stated above, the B, R and G light modulated by the liquid crystal panels 86, 88 and 93 are synthesized through the PBS 90. Then, after a polarization direction is rotated by 90 degrees by a ½ wavelength plate 94, the synthesized light enters the projection lens 30 through a polarizer 95.

In this configuration example, the liquid crystal panels 86, 88 and 93 are placed in portrait orientation on the placement plane such that shorter sides of the panels come into contact with the placement plane. Therefore, the PBSs 84, 90 and 91 are narrower and longer in the direction of the Z axis, and are smaller in section in the direction of the X-Y plane. Corresponding to the shapes of the PBSs 84, 90 and 91, the ¼ wavelength plates 85, 87 and 92, the ½ wavelength plates 83, 89 and 94, and the polarizer 95 are also narrower and longer in the direction of the Z axis, and placed in portrait orientation on the placement plane such that shorter sides of these members come into contact with the placement plane, respectively. Therefore, the optical engine 10 can be reduced in dimension in the direction of the X-Y plane, same as the embodiment.

FIGS. 13A and 13B illustrate how the dimension of the optical engine 10 in the direction of the X-Y plane changes between when the liquid crystal panels 86, 88 and 93 and other members are placed in portrait orientation and when the same are placed in landscape orientation. As understood from FIGS. 13A and 13B, distances W1 and W2 have a relationship of W1<W2, and distances L1 and L2 have a relationship of L1<L2.

According to this embodiment, by placing the liquid crystal panels 86, 88 and 93 and other members in portrait orientation, it is possible to shorten the dimension of the optical engine 10 in the direction of the X-Y plane and reduce the optical engine 10 in size. Therefore, same as the embodiment, the distance (H0) from the projection light emitting position to the projection plane (screen surface) can be shortened, thereby decreasing a possibility that the projection light is blocked by an obstacle or the like.

As foregoing, while a preferred embodiment of the present invention has been described, the present invention is not limited to the above embodiment. Further, various other changes and modifications can be made with respect to the embodiments of the present invention.

In the foregoing embodiment, for example, the B, G and R light are modulated by the liquid crystal panels, and the modulated light are synthesized by the dichroic prisms or the PBSs. Alternatively, light not in these wavelength bands may be further modulated by corresponding liquid crystal panels, and the modulated light may be synthesized together with the B, G and R light and then enter the projection lens 30. For example, if the light emitted from a lamp in the light source 11 includes a spectral component in a yellow wavelength band (hereinafter referred to as "Ye light"), in addition to the B, G and R light, the Y light may be guided into a corresponding liquid crystal panel, and the Ye light modulated by the liquid crystal panel may be synthesized together with the B, G and R light by the dichroic prism or the PBS.

Additionally, in the configuration example of FIG. 1, the liquid crystal panel for B light is disposed at a position closest to the projection plane (screen surface), and the liquid crystal panel for R light is disposed at a position farthest from the projection plane (screen surface). For increased color purity of the B light, the liquid crystal panels for R light, G light and B light may be arranged in this order from the projection plane (screen surface). Alternatively, the liquid crystal panel for R light or B light may be disposed at a position of the liquid crystal panel for G light in the configuration example of FIG. 1.

In using reflective liquid crystal panels, various configurations may be employed in addition to the configuration example of FIG. 12. In the configuration example of FIG. 12, for example, the B, G and R light are separated and synthesized by a combination of the PBSs and the ½ wavelength plates with wavelength selectivity. Alternatively, the present invention may be configured to separate and synthesize the B, G and R light by using a dichroic mirror and a dichroic prism, as described in Japanese Patent Publication No. 2000-284228, for example. Also in this case, the dichroic mirror and the dichroic prism are reduced in dimension in an in-plane direction of the placement plane, which results in size reduction of the throw distance (H0).

While the projection lens 30 and the bending mirror 40 are separate components in the foregoing embodiment, they may be integrated. For example, the bending mirror 40 may be disposed in a lens holder for storing the lens group (the projection lens 30) so that light transmitting through the lens group is reflected by the bending mirror 40 in a direction orthogonal to an optical axis of the lens group. In this case, the lens holder has a notch or the like at a position where the light reflected by the bending mirror 40 transmits through.

Various changes can be made to the foregoing embodiments of the present invention as appropriate, without deviating from a technical concept defined in the scope of the claims.

What is claimed is:

1. A projection display device comprising:
   a light source;
   imagers individually disposed corresponding to light in wavelength bands to be modulated;
   a light guiding optical system for guiding light in the respective wavelength bands, among light from the light source, to the respective corresponding imagers;
   a light synthesis element for synthesizing the light in the respective wavelength bands modulated by the imagers; and
   a projection optical system having a curved mirror for enlarging and projecting the light synthesized by the light synthesis element,
   wherein optical members forming the imagers and the light guiding optical system are placed in portrait orientation.

2. A projection display device according to claim 1, wherein
   the projection optical system has a bending mirror for reflecting light synthesized by the light synthesis element to the curved mirror.

3. A projection display device according to claim 2, wherein
   the light source is disposed more distant from the projection plane than the light guiding optical system.

4. A projection display device according to claim 1, wherein
   the light source is disposed more distant from the projection plane than the light guiding optical system.

* * * * *